United States Patent [19]
Van Fleet

[11] Patent Number: 5,764,884
[45] Date of Patent: Jun. 9, 1998

[54] METHOD AND APPARATUS FOR IMPROVED INSTRUCTION COUNTING SCHEMES

[75] Inventor: James William Van Fleet, Austin, Tex.

[73] Assignee: International Business Machines Corp., Armonk, N.Y.

[21] Appl. No.: 741,734

[22] Filed: Oct. 31, 1996

[51] Int. Cl.$^6$ ............................................. G06F 11/28
[52] U.S. Cl. ............................................. 395/183.14
[58] Field of Search ............... 364/DIG. 1 MS File, 364/DIG. 2 MS File; 395/183.13, 183.14, 183.15, 376, 392

[56] References Cited

U.S. PATENT DOCUMENTS

| | | |
|---|---|---|
| 4,218,741 | 8/1980 | Dixon et al. . |
| 4,445,170 | 4/1984 | Hughes et al. . |
| 4,484,271 | 11/1984 | Miu et al. . |
| 4,541,056 | 9/1985 | Matthews . |
| 4,616,331 | 10/1986 | Kinoshita et al. . |
| 4,734,849 | 3/1988 | Kinoshita et al. . |
| 5,428,749 | 6/1995 | Rouse et al. . |
| 5,455,936 | 10/1995 | Maemura ..................... 395/183.14 |

*Primary Examiner*—Robert B. Harrell
*Attorney, Agent, or Firm*—Richard A. Henkler

[57] ABSTRACT

A method and apparatus for monitoring the execution of a procedure having multiple exit points without modifying the software via breakpoints. The starting address of the procedure is loaded into an Instruction Address Break Register (IABR). Upon execution of the starting address the IABR raises an exception. The processing of the exception is used to implement a counting routine and for loading the IABR with the address of the calling party via the Link Register. Upon execution of the address of the calling party, the IABR once again raises an exception. The processing of the second exception is used for stopping the counter and performing any related analysis.

21 Claims, 3 Drawing Sheets

1

METHOD AND APPARATUS FOR IMPROVED INSTRUCTION COUNTING SCHEMES

BACKGROUND

1. Field of the Present Invention

The present invention generally relates to data processing systems, and more specifically, to data processing systems which implement instruction counting schemes.

2. History of Related Art

In today's ever increasing demand for faster more powerful data processing systems, the need to efficiently and accurately monitor and analyze the execution of various software within the data processing system is often a crucial and mandatory procedure to ensure maximum throughput.

This type of analysis typically requires some method for tracking the execution of a desired subset of instructions (e.g. a procedure), and the time necessary to complete execution of the subset.

Current methods accomplish this task by modifying the software via breakpoints in order to identify the particular subset, and use a counter to track the time associated with the execution thereof. Modification of the program, however, is not always desirable, and therefore, some other solution is required for tracking the execution of a particular subset of instructions.

Another problem associated with the above method for performing analysis on the software is that the subset may have multiple exit points. Thus, requiring additional modifications via additional breakpoints to ensure coverage.

It would, therefore, be a distinct advantage to have an apparatus and method that would monitor the execution of a subset of instructions without modifying the software via breakpoints or other means. The method and apparatus, would be further advantages if it was capable of monitoring subsets that have multiple exit points without modification of the software. The present invention provides such an improved apparatus and method.

SUMMARY OF THE PRESENT INVENTION

In one aspect, the present invention is a method of monitoring the execution of a procedure in a computer program without modifying the program. The procedure having multiple exit points. The method includes the steps of loading the physical address of the procedure into an instruction address breakpoint register, and loading the address of an instruction subsequent to a branch instruction into a register. The method further includes the steps of raising a first exception in response to reaching the address stored in the address breakpoint register, and loading, in response to the first exception, the instruction address breakpoint register with the address stored in the register. The method also includes the steps of raising a second exception in response to reaching the address stored in the address breakpoint register, and monitoring the procedure during the time between the first and second exceptions.

BRIEF DESCRIPTION OF THE DRAWINGS

The present invention will be better understood and its numerous objects and advantages will become more apparent to those skilled in the art by reference to the following drawings, in conjunction with the accompanying specification, in which:

2

Figure 1:
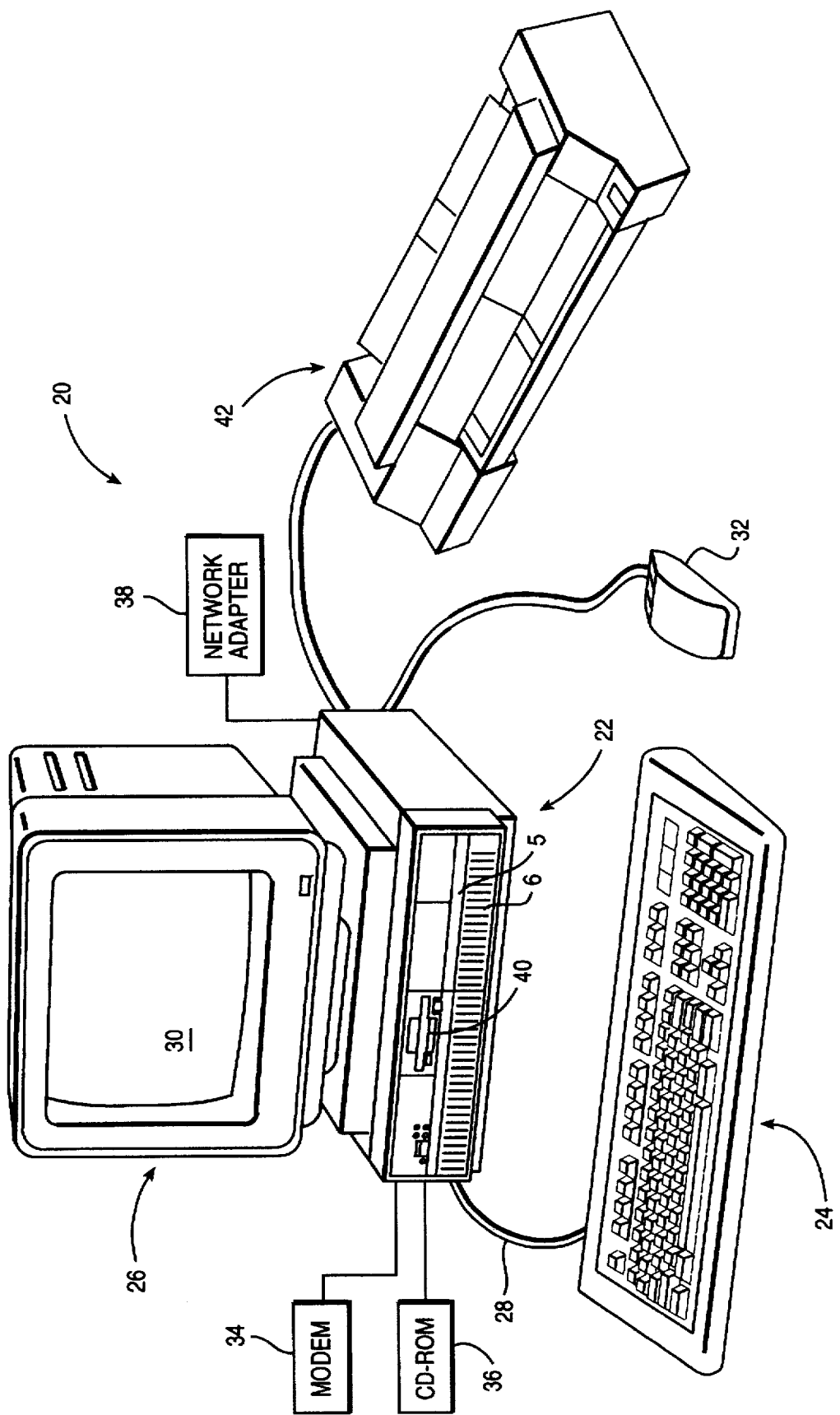
Figure 2:
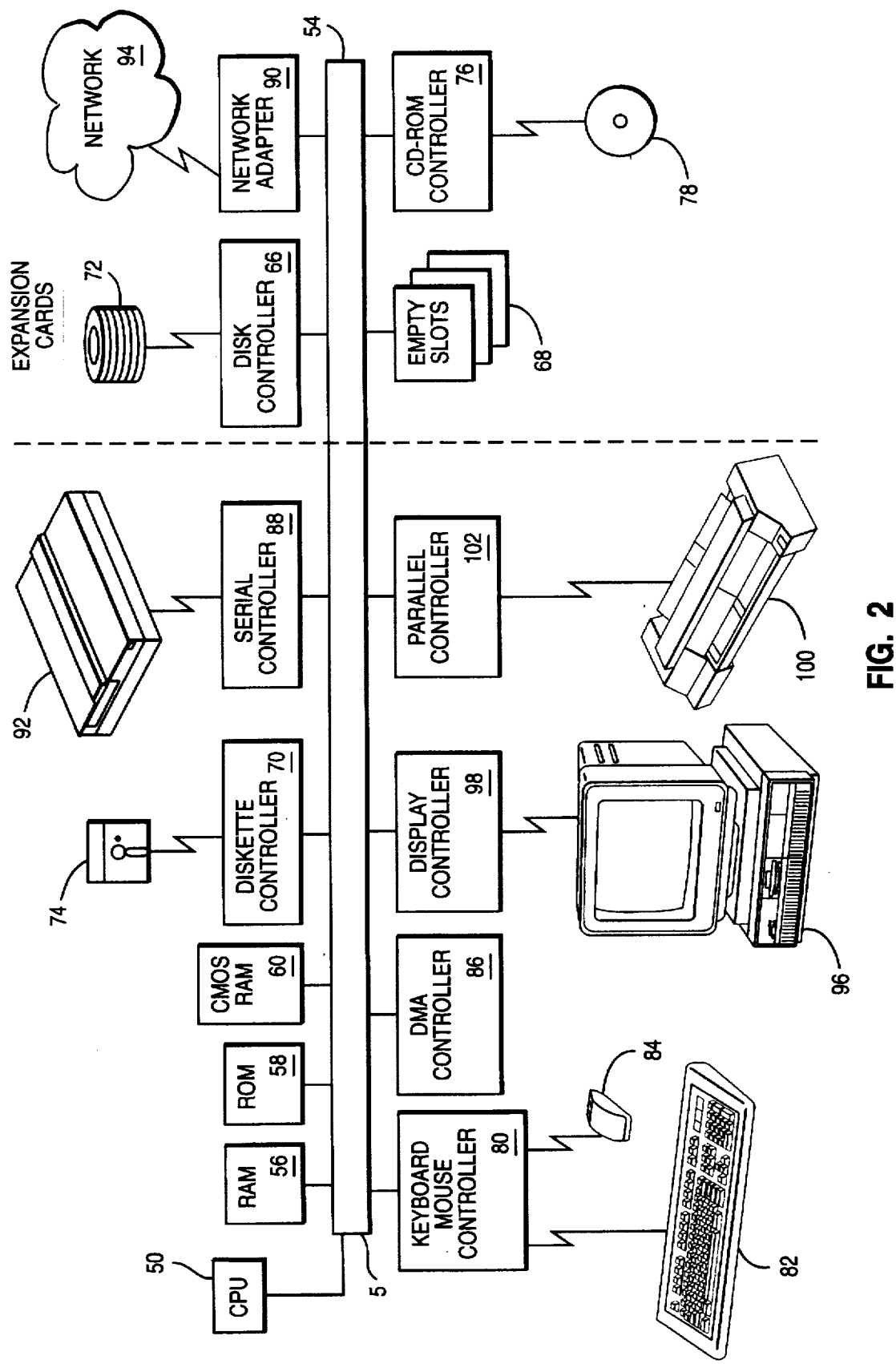
Figure 3:
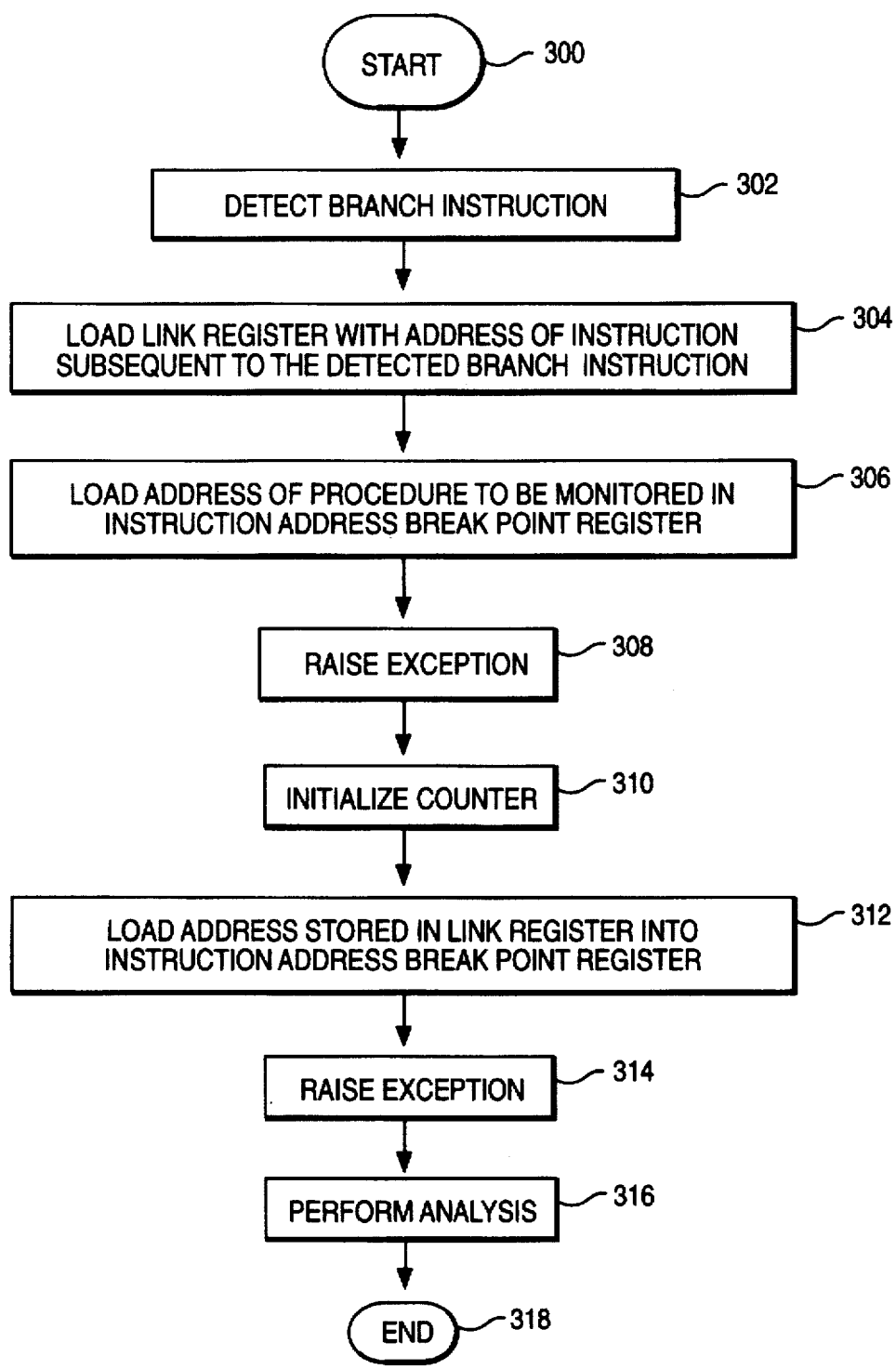

FIG. 1 is a schematic diagram of a typical multi-processor computer system in which the present invention can be practiced;

FIG. 2 is a high level block diagram illustrating selected components that can be included in the data processing system of FIG. 1 according to the teachings of the present invention; and FIG. 3 is a flowchart illustrating the method for monitoring a procedure without modifying the code of a program according to the teachings of the present invention.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, are within the skills of persons of ordinary skill in the relevant art.

Reference now being made to FIG. 1, a data processing system 20 is shown in which the present invention can be practiced. The data processing system 20 includes processor 22, keyboard 82, and display 96. Keyboard 82 is coupled to processor 22 by a cable 28. Display 96 includes display screen 30, which may be implemented using a cather ray tube (CRT) a liquid crystal display (LCD) an electrode luminescent panel or the like. The data processing system 20 also includes pointing device 84, which may be implemented using a track ball, a joy stick, touch sensitive tablet or screen, track path, or as illustrated a mouse. The pointing device 84 may be used to move a pointer or cursor on display screen 30. Processor 22 may also be coupled to one or more peripheral devices such as modem 92, CD-ROM 78, network adapter 90, and floppy disk drive 40, each of which may be internal or external to the enclosure or processor 22. An output device such as printer 100 may also be coupled with processor 22.

It should be noted and recognized by those persons of ordinary skill in the art that display 96, keyboard 82, and pointing device 84 may each be implemented using anyone of several known off-the-shelf components.

Reference now being made to FIG. 2, a high level block diagram is shown illustrating selected components that can be included in the data processing system 20 of FIG. 1 according to the teachings of the present invention. The data processing system 20 is controlled primarily by computer readable instructions, which can be in the form of software, wherever, or by whatever means such software is stored or accessed. Such software may be executed within the Central Processing Unit (CPU) 50 to cause data processing system 20 to do work.

Memory devices coupled to system bus 5 include Random Access Memory (RAM) 56, Read Only Memory (ROM) 58, and non-volatile memory 60. Such memories include circuitry that allows information to be stored and retrieved. ROMs contain stored data that cannot be modified. Data stored in RAM can be changed by CPU 50 or other hardware devices. Non-volatile memory is memory that does not loose data when power is removed from it. Non-volatile memories include ROM, EPROM, flash memory, or battery-pack CMOS RAM. As shown in FIG. 2, such battery-pack CMOS RAM may be used to store configuration information.

An expansion card or board is a circuit board that includes chips and other electronic components connected that adds functions or resources to the computer. Typically expansion cards add memory, disk-drive controllers 66, video support, parallel and serial ports, and internal modems. For lap top, palm top, and other portable computers, expansion cards usually take the form of PC cards, which are credit card-sized devices designed to plug into a slot in the side or back of a computer. An example such a slot is PCMCIA slot (Personal Computer Memory Card International Association) which defines type 1, 2 and 3 card slots. Thus, empty slots 68 may be used to receive various types of expansion cards or PCMCIA cards.

Disk controller 66 and diskette controller 70 both include special purpose integrated circuits and associated circuitry that direct and control reading from and writing to hard disk drive 72, and a floppy disk or diskette 74, respectively. Such disk controllers handle task such as positioning read/write head, mediating between the drive and the CPU 50, and controlling the transfer information to and from memory. A single disk controller may be able to control more than one disk drive.

CD-ROM controller 76 may be included in data processing 20 for reading data from CD-ROM 78 (compact disk read only memory). Such CD-ROMs use laser optics rather then magnetic means for reading data.

Keyboard mouse controller 80 is provided in data processing system 20 for interfacing with keyboard 82 and pointing device 84. Such pointing devices are typically used to control an on-screen element, such as a cursor, which may take the form of an arrow having a hot spot that specifies the location of the pointer when the user presses a mouse button. Other pointing devices include the graphics tablet, the stylus, the light pin, the joystick, the puck, the trackball, the trackpad, and the pointing device sold under the trademark "TrackPoint" by IBM.

Communication between processing system 20 and other data processing systems may be facilitated by serial controller 88 and network adapter 90, both of which are coupled to system bus 5. Serial controller 88 is used to transmit information between computers, or between a computer and peripheral devices, one bit at a time over a single line. Serial communications can be synchronous (controlled by some standard such as a clock) or asynchronous (managed by the exchange of control signals that govern the flow of information). Examples of serial communication standards include RS-232 interface and the RS-422 interface. As illustrated, such a serial interface may be used to communicate with modem 92. A modem is a communication device that enables a computer to transmit information over a standard telephone line. Modems convert digital computer signals to interlock signals suitable for communications over telephone lines. Modem 92 can be utilized to connect data processing system 20 to an on-line information service, such as an information service provided under the service mark "PRODIGY" by IBM and Sears. Such on-line service providers may offer software that may be down loaded into data processing system 20 via modem 92. Modem 92 may provide a connection to other sources of software, such as server, an electronic bulletin board, the internet or World Wide Web.

Network adapter 90 may be used to connect data processing system 20 to a local area network 94. Network 94 may provide computer users with means of communicating and transferring software and information electronically. Additionally, network 94 may provide distributed processing, which involves several computers in the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with CRT-based video display, an LCD-based flat panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as transparency. Other type of printers may include an image setter, a plotter, or a film recorder.

Parallel controller 102 is used to send multiple data and control bits simultaneously over wires connected between system bus 5 and another parallel communication device, such as printer 100.

CPU 50 fetches, decodes, and executes instructions, and transfers information to and from other resources via the computers main data-transfer path, system bus 5. Such a bus connects the components in a data processing system 20 and defines the medium for data exchange. System bus 5 connects together and allows for the exchange of data between memory units 56, 58, and 60, CPU 50, and other devices as shown in FIG. 2.

During the execution of programs on the data processing system 100 it may become desirable to conduct performance or other types of adjustment analysis to one of the programs. These types of analysis typically require some method for tracking the execution of a desired subset of instructions (e.g. a procedure), the time necessary to complete execution of the subset, and other related information.

This is typically accomplished by modifying the program via breakpoints to identify the particular subset, and using a counter to track the time associated with the execution thereof. Modification of the program is not always desirable, and therefore, some other solution is required for tracking the execution of a particular subset of instructions.

Another problem associated with the above methods for performing analysis on the programs is that the subset often has multiple exit points. Thus, requiring additional modifications via additional breakpoints to ensure coverage. The present invention solves the above noted problems as explained hereinafter.

For the moment, assume that the following procedure resides at the addresses indicated in Table I below.

TABLE I

| 0005 | procedure Loop1; |
| 0007 | { |
| 0010 | For (i = 0; i < 50; ++i); |
| 0020 | { |
| 0030 | Add xx, xx; |
| 0040 | Subtract xx,xx; |
| 0050 | Total = xx; |
| 0060 | } |
| 0070 | } |

As indicated in Table 1, the above noted pseudo code represents a procedure with only one exit point at address 0070.

Since is only one exit point (0070), the program (pseudo code) could be modified to have breakpoints at addresses 0007 and 0070 in order to evaluate the time associated with the execution of the instructions residing therebetween. The above noted example, however, is not necessarily illustrative of the type of procedure typically encountered in the industry. In fact, more often than not procedures typically have multiple exit points. Thus, the address of the exit point for counting purposes (analysis) is not easily determined without modification of the program via breakpoints.

More specifically, an example of a procedure with multiple exits is illustrated in Table II below.

TABLE II

| | |
|---|---|
| 0010 | procedure test; |
| 0020 | { |
| 0030 | for (i = 0; i < 100; ++i) |
| 0035 | { |
| 0040 | If (ok) then |
| 0045 | { |
| 0050 | Add xx,xx; |
| 0060 | Subtract xx,xx; |
| 0070 | Total = xx; |
| 0075 | Return; |
| 0080 | } |
| 0090 | else { |
| 0100 | Error = 7; |
| 0110 | Return |
| 0120 | } |
| 0125 | } |
| 0130 | } |

From the above noted pseudo code, it becomes readily apparent that multiple exit points exist for the procedure test (i.e. 0075, 0110, and 0130). In such a scenario, current methods that modify the program would require breakpoint insertions at addresses 0075, 0110, and 0130, respectively.

In a preferred embodiment of the present invention, the data processing system 100 is a RS/6000™ model J40 produced by International Business Machines, and the CPU 50 is of the PowerPc™ family series (e.g. 601, 604, or their successor(s)). The data processing system 100 also executes the AIX™ operating system (not shown). The PowerPc family of processors (CPUs) includes branch and link instructions (e.g. branch (BL), branch absolute (BLA), branch (condition) (BCL), and branch condition to Counter Register then link (BCCTRL)) as more fully described in "PowerPC Microprocessor Family: the Programming Environments", published 1994 by Motorola, and which is hereby incorporated by reference herein.

In general, the branch and link instructions (BL, BLA, BCL, BCLA, and BCCTRL) allow the ability to place the Instruction Address Register (IAR) in a Link Register. The IAR at the time of the branch and link contains the next instruction to be executed in the calling procedure after the branch is executed. This instruction is the called procedure return address.

For the moment, further assume that the pseudo code of Table II is called using the pseudo code enumerated in Table III. below.

TABLE III

| | |
|---|---|
| 0000 | {....... |
| 0001 | BL test; |
| 0002 | ......} |

In the preferred embodiment of the present invention, the address of the routine to be monitored is placed in the Instruction Address Breakpoint Register (IABR). In this example, address 0010 of Table II is used. During execution of the program, an Instruction Address Breakpoint Exception is raised when the address 0010 is reached, generally by a Branch and Link instruction. When the exception occurs, counting is triggered and the contents of the link register are placed in the IABR. When the instruction represented by the link register address is encountered, a second exception occurs; counting is stopped and the IABR is set to the next breakpoint. The response to the initial exception is illustrated in pseudo code by Table IV.

TABLE IV

| procedure count: |
|---|
| { |
| IAB exception |
| set IABR = linkReg |
| start counting |
| IAB exception |
| stop counting |
| } |

The above noted pseudo code represents the response to the Instruction Address Breakpoint (IAB) exception raised from reaching the execution of address 0010 from table II. Upon notification of the exception, the IABR is set equal to the address stored within the Link Register (LinkReg). In this example, that would be address 0002 of Table III.

In further elaboration of the above example, the IABR is loaded with the address (0010) of procedure test (Table II) prior to executing the BL test (address 0001 Table III). Upon reaching the address of 0010 during the execution of the program, an IAB exception is raised.

The IAB exception is handled in the count procedure as enumerated in Table IV. Specifically, upon receiving notification of the IAB exception, the IABR register is loaded with the address stored in the Link Reg. In this case, the address following the BLA (0002) instruction of Table III. Thus, it should be noted that at any one of the exit points (0075, 0110, or 0130) of procedure Test (Table II), the second exception is raised notifying the end of execution within the procedure test. Consequently, the monitoring associated, such as counting, can cease.

Reference now being made to FIG. 3, a flow chart is shown illustrating a method used by the present invention for monitoring a procedure without modifying the program. The method begins at step 300 and proceeds to step 302 where a branch instruction is detected. Thereafter, the method proceeds to step 304 where a link register is loaded with the address of the instruction that is subsequent to the detected branch instruction. The method then proceeds to step 306 where the address of the procedure to be monitored is loaded into the Instruction Address Breakpoint Register. Thereafter, the method proceeds to step 308, where an exception is raised in response to the program reaching the address specified in the Instruction Address Breakpoint Register (i.e. the monitored procedure).

In the preferred embodiment of the present invention, a counter is used to determine the execution time required for proceeding through the execution of the procedure. Those skilled in the art will readily recognize that other means can be used in response to the exception being raised in lieu of the counter for performing other types of analysis. The method then proceeds to step 310 where a counter is initialized in response to handling the exception raised at step 308. Thereafter, the method proceeds to step 312 where the address that was stored in the link register is loaded into the Instruction Address Breakpoint Register. The method then proceeds to step 314 where an exception is raised in response to the execution of the program reaching the address stored in the Instruction Address Breakpoint Register (i.e. the subsequent instruction). The method then proceeds to step 316 where the value of the counter is used in performing in analysis for determining the time associated with the execution of the monitored procedure. The method then proceeds to end at step 318.

From the above explanation, it can be seen that by using the present invention, the monitoring of a program does not require modification, even when multiple exit points exist within a closed routine.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. An apparatus, in a computer system, for monitoring the execution of a procedure in a computer program without modifying the program, the procedure having multiple exit points, the apparatus comprising:

means for loading the physical address of the procedure into an instruction address breakpoint register;

means for loading the address of an instruction subsequent to a branch instruction into a register;

means for raising a first exception in response to reaching the address stored in the address breakpoint register;

means for loading, in response to the first exception, the instruction address breakpoint register with the address stored in the register;

means for raising a second exception in response to reaching the address stored in the address breakpoint register; and means for monitoring the procedure during the time between the first and second exceptions.

2. The apparatus of claim 1 further comprising:

means for detecting a branch instruction in a calling procedure.

3. The apparatus of claim 2 wherein the means for loading the address of an instruction, includes:

means for loading, in response to detecting the branch instruction, the address of an instruction subsequent to the branch instruction into the register.

4. The apparatus of claim 3 further comprising:

means for executing the branch instruction.

5. The apparatus of claim 4 further comprising:

means for exiting the procedure in response to executing instructions residing therein.

6. The apparatus of claim 5 wherein the means for monitoring includes:

means for initiating, in response to the first exception, a counter; and means for calculating, in response to the second exception, the time for the executing the procedure using the value of the counter.

7. The apparatus of claim 6 wherein the means for monitoring includes:

means for initiating, in response to the first exception, a counter; and means for calculating, in response to the second exception, the time for the executing the procedure using the value of the counter.

8. A method of monitoring the execution of a procedure in a computer program without modifying the program, the procedure having multiple exit points, the method comprising the steps of:

loading the physical address of the procedure into an instruction address breakpoint register;

loading the address of an instruction subsequent to a branch instruction into a register;

raising a first exception in response to reaching the address stored in the address breakpoint register;

loading, in response to the first exception, the instruction address breakpoint register with the address stored in the register;

raising a second exception in response to reaching the address stored in the address breakpoint register; and monitoring the procedure during the time between the first and second exceptions.

9. The method of claim 8 further comprising the step of:

detecting a branch instruction in a calling procedure.

10. The method of claim 9 wherein the step of loading the address of an instruction, includes the step of:

loading, in response to detecting the branch instruction, the address of an instruction subsequent to the branch instruction into the register.

11. The method of claim 10 further comprising the step of:

executing the branch instruction.

12. The method of claim 11 further comprising the step of:

exiting the procedure in response to executing instructions residing therein.

13. The method of claim 12 wherein the step of monitoring includes the steps of:

initiating, in response to the first exception, a counter; and calculating, in response to the second exception, the time for the executing the procedure using the value of the counter.

14. The method of claim 8 wherein the step of monitoring includes the steps of:

initiating, in response to the first exception, a counter; and calculating, in response to the second exception, the time for the executing the procedure using the value of the counter.

15. A computer program product for use with a data processing system, the computer program product comprising:

a computer usable medium having computer readable program code means embodied therein for monitoring the execution of a procedure in a computer program without modifying the program, the procedure having multiple exit points, the computer readable program code comprising:

means for loading the physical address of the procedure into an instruction address breakpoint register;

means for loading the address of an instruction subsequent to a branch instruction into a register;

means for raising a first exception in response to reaching the address stored in the address breakpoint register;

means for loading, in response to the first exception, the instruction address breakpoint register with the address stored in the register;

means for raising a second exception in response to reaching the address stored in the address breakpoint register; and means for monitoring the procedure during the time between the first and second exceptions.

16. The computer program product of claim 15 wherein the computer readable program code means further comprises:

means for detecting a branch instruction in a calling procedure.

17. The computer program product of claim 16 wherein the means for loading the address of an instruction, includes:

means for loading, in response to detecting the branch instruction, the address of an instruction subsequent to the branch instruction into the register.

18. The computer program product of claim 17 wherein the computer readable program code means further comprises:

means for executing the branch instruction.

19. The computer program product of claim 18 wherein the computer readable program code means further comprises:

means for exiting the procedure in response to executing instructions residing therein.

20. The computer program product of claim 19 wherein the means for monitoring includes:

means for initiating, in response to the first exception, a counter; and means for calculating, in response to the second exception, the time for the executing the procedure using the value of the counter.

21. The computer program product of claim 15 wherein the means for monitoring includes:

means for initiating, in response to the first exception, a counter; and means for calculating, in response to the second exception, the time for the executing the procedure using the value of the counter.

* * * * *